United States Patent
Zhong et al.

(10) Patent No.: US 10,453,622 B2
(45) Date of Patent: Oct. 22, 2019

(54) LOW COST HIGH POWER DRY POWDER INJECTED ELECTRODES AND METHOD OF MAKING SAME

(71) Applicant: EnerTrode, Inc., Hayward, CA (US)

(72) Inventors: Linda Zhong, Oakland, CA (US); Martin Matthew Zea, Galt, CA (US); Kathleen Jingling Qiu, Alameda, CA (US)

(73) Assignee: LiCAP Technologies, Inc., Sacramento, CA (US)

( * ) Notice: Subject to any disclaimer, the term of this patent is extended or adjusted under 35 U.S.C. 154(b) by 158 days.

(21) Appl. No.: 15/458,221

(22) Filed: Mar. 14, 2017

(65) Prior Publication Data

US 2018/0269464 A1 Sep. 20, 2018

(51) Int. Cl.
| | |
|---|---|
| *H01M 4/04* | (2006.01) |
| *H01M 4/139* | (2010.01) |
| *H01G 11/86* | (2013.01) |
| *H01G 11/28* | (2013.01) |
| *H01G 11/38* | (2013.01) |
| *H01M 4/62* | (2006.01) |
| *H01G 11/42* | (2013.01) |
| *H01M 4/525* | (2010.01) |
| *H01M 4/58* | (2010.01) |
| *H01M 4/02* | (2006.01) |
| *H01G 11/50* | (2013.01) |

(52) U.S. Cl.
CPC ............. *H01G 11/86* (2013.01); *H01G 11/28* (2013.01); *H01G 11/38* (2013.01); *H01M 4/0402* (2013.01); *H01M 4/0404* (2013.01); *H01G 11/42* (2013.01); *H01G 11/50* (2013.01); *H01M 4/043* (2013.01); *H01M 4/139* (2013.01); *H01M 4/525* (2013.01); *H01M 4/5825* (2013.01); *H01M 4/622* (2013.01); *H01M 4/625* (2013.01); *H01M 2004/021* (2013.01)

(58) Field of Classification Search
CPC combination set(s) only.
See application file for complete search history.

(56) References Cited

U.S. PATENT DOCUMENTS

| | | | | |
|---|---|---|---|---|
| 2001/0012588 A1* | 8/2001 | Kaido | ...................... | H01M 4/04 429/233 |
| 2013/0273407 A1* | 10/2013 | Kylyvnyk | ........... | H01M 2/1673 429/144 |
| 2015/0132656 A1* | 5/2015 | Kato | ........................ | H01M 4/62 429/233 |

* cited by examiner

*Primary Examiner* — Yoshitoshi Takeuchi
(74) *Attorney, Agent, or Firm* — Stetina Brunda Garred and Brucker; Mark B. Garred

(57) ABSTRACT

A method for producing an electrode for an energy storage device includes: forming a current collector from a conductive material; forming a primer layer on the current collector; injecting dry powder electrode materials into the primer layer, wherein the dry powder electrode materials injected into the primer layer form an electrode film in electrical contact with the current collector.

25 Claims, 4 Drawing Sheets

LOW COST HIGH POWER DRY POWDER INJECTED ELECTRODES AND METHOD OF MAKING SAME

BACKGROUND

1. Technical Field

Apparatuses and methods consistent with the present inventive concept relate to energy storage devices, and more particularly to electrodes for energy storage devices.

2. Related Art

Commercial energy storage device electrodes are manufactured by coating a slurry onto a metallic current collector. To fabricate an electrode by a conventional slurry coating process, a binder, for example polyvinylidene fluoride (PVDF), is pre-dissolved in a solvent to form the binder solution. A widely used solvent for energy storage device manufacture is N-methylpyrrolidine, also known as NMP. The conductive carbon active material and binder solution are mixed to form the slurry. The slurry is then coated onto a current collector by a cylindrical roller. The current collector along with the coating layer is passed through a long dryer, where the solvent is dried and removed from the electrode.

Binding mechanisms for powder particles to powder particles may be different than binding mechanisms for powder particles to a metal current collector. In the coating process, in order to form strong bonds between the powder particles and between the powder particles to the metal current collector, a high percentage of the binder, for example greater than 10% of total solids, is used since the same binder (or binders) has (have) to bond two different types of materials (i.e., the powder particles and the metal current collector. A high percentage of binder means that less active materials can be added to the electrode formulation. The higher percentage of binder blocks the surface area of the active materials, thus lowering the energy density of the device. Further, the higher percentage of binder blocks electrical flow between the active material particles, thus increasing resistance and reducing power density for the device. Therefore, in conventional coating processes it is a common practice that a "just enough" binder, for example about 5-10% of total solids, is added in the electrode formulation resulting in compromised electrode bonding force. Accordingly, powder particles easily flake off electrodes made by conventional coating methods.

Electrodes for power batteries require low ESR which requires a strong powder to metal (PM) bond and low electrical resistance between the current collector and the electrode film. FIG. 1 is a diagram illustrating a conventional electrode 100. Referring to FIG. 1, the conventional electrode 100 may include a current collector 110, a primer layer 120, and an electrode film 130. When the electrode active materials are not very conductive, electrode manufacturers coat the current collector 110 with a primer layer 120 having main components of conductive carbon and a binder that is specifically designed for bonding the conductive carbon particles to the metal current collector 110. After the primer layer 120 is dried, a layer of the electrode film 130 is coated on top of the primer layer 120. Thus, the electrodes 100 coated with the primer layer have at least three layers: 1) the inner-most layer of the current collector 110; 2) the primer layer 120 coated on top of the current collector 110; and 3) the electrode film layer 130 at the outside coated on top of the primer layer 120.

A significant amount of energy and time is needed to dry and remove the solvents, which adds the cost and cycle time to the manufacture of the product. For example, drying time for electrodes produced by conventional coating processes can take 12-24 hours at 120° C. In addition, for commercial applications an NMP recovery system must be in place during the drying process to recover evaporated NMP due to the high cost of the solvent and to reduce potential pollution caused by releasing NMP to the environment. The mandatory recovery system requires a large capital investment and is expensive to operate.

Less expensive and environmentally friendly solvents, such as aqueous based solvents, eliminate the need for the recovery system, but the electrodes still require the time and energy necessary for the long drying step. Furthermore, some active materials, such as lithium contained powders used in Li-ion battery cathodes, are highly sensitive to the aqueous based solvents. Extended soak times in the aqueous solvent required by conventional coating processes significantly damages the functionality of such active materials.

Manufacturing electrodes with dry particles coated on current collectors eliminates solvents and the disadvantages that come with using them. Conventionally, a variety of methods such as pulsed laser and sputtering deposition have been used for dry electrode manufacturing. These conventional methods of dry battery electrode manufacturing, however, suffer from very slow deposition rates and a need for high temperature annealing.

A dry painting method, also known as electrostatic spraying, has been proposed. The dry painting method consists of using a powder pick-up and dispensing unit and an electrostatic spray gun to charge the fluidized dry particles. After being charged, the dry particles will be drawn to the grounded current collector and deposited on the current collector. The dry painting method is a simple and low cost method; however, just as in the coating method, an excess amount of binder (or binders) is used in the electrode formulation for the same reasons. Further, since the powder particles have to be charged to a high voltage, a conductive active material, such as graphite which is widely used in the Li-ion battery industry, is difficult to paint onto the electrode by the dry painting method.

Accordingly, there is a need to make an electrode for energy storage devices without using NMP such that there is no need of a solvent recovery system and no need of a long drying process steps. Also, there is a need to make an electrode energy storage device with minimum amount of binder yet forming strong powder particle to particle bond and strong powder particle to current collector bond.

SUMMARY

According to various embodiments there is provided an electrode for energy storage devices and a method to make the same.

According to various aspects there is provided a method for producing an electrode for an energy storage device. In some aspects, the method may include: forming a current collector from a conductive material; forming a primer layer on the current collector; injecting dry powder electrode materials into the primer layer, wherein the dry powder electrode materials injected into the primer layer form an electrode film in electrical contact with the current collector.

According to various aspects there is provided an electrode for an energy storage device. In some aspects, the electrode may include: a current collector formed from a conductive material; and an electrode film comprising dry powder electrode materials injected into a primer layer. The dry powder electrode materials may be embedded into the primer layer forming electrical contact with the current collector.

Other features and advantages should be apparent from the following description which illustrates by way of example aspects of the various teachings of the disclosure.

BRIEF DESCRIPTION OF THE DRAWINGS

Aspects and features of the various embodiments will be more apparent by describing examples with reference to the accompanying drawings, in which.

Other features and advantages should be apparent from the following description which illustrates by way of example aspects of the various teachings of the disclosure.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Figure 1:
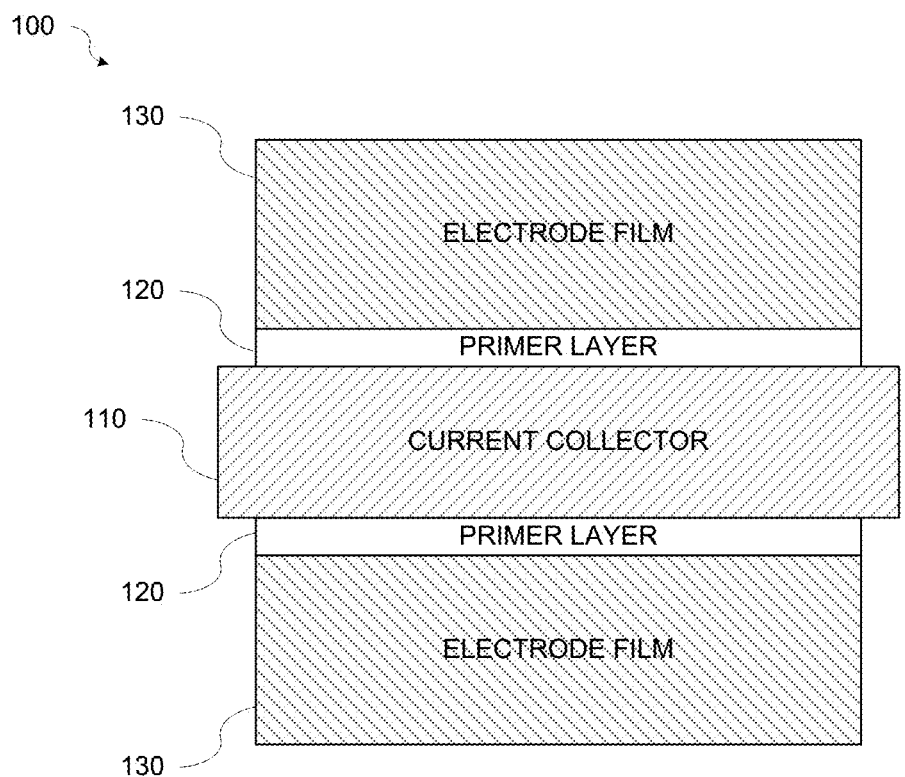
FIG. 1 is a diagram illustrating a conventional electrode.
Figure 2:
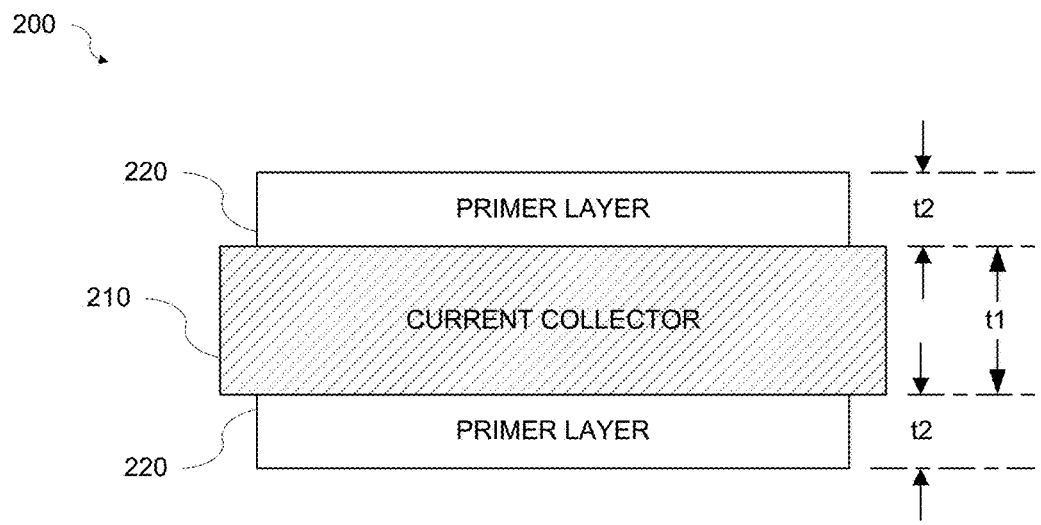
FIG. 2 is a diagram illustrating a partially formed electrode having a primer layer formed on a current collector in accordance with various aspects of the present disclosure.

In accordance with various aspects of the present disclosure, an electrode for an energy storage device is provided. FIG. 2 is a diagram illustrating a partially formed electrode 200 having a primer layer formed on a current collector in accordance with various aspects of the present disclosure. Referring to FIG. 2, the partially formed electrode 200 may include a current collector 210 and a primer layer 220.

The current collector 210 may be formed from a conductive foil or mesh and may have a thickness t1 of about 10-80 μm. For example, the current collector 210 may be formed from an aluminum (Al) foil or mesh or a copper (Cu) foil or mesh. One of ordinary skill in the art will appreciate that other conductive materials may be used to form the current collector without departing from the scope of the present disclosure.

The primer layer 220 may be formed from a primer layer slurry that may include a binder (or binders) designed to bond conductive material particles and/or active material particles to the metal current collector 210 (referred to herein as a "PM binder"), a solvent, for example but not limited to an aqueous solvent that will dissolve the PM binder, and conductive material particles. The PM binder or binders may be, for example but not limited to, styrene butadiene rubber (SBR), cellulous, thermoplastic acrylic resin, Styrene-Acryl, etc., or combinations thereof. The aqueous solvent may be, for example, but not limited to, water. The conductive material particles may be, for example, but not limited to, conductive carbon black particles, conductive carbon fibers, graphite powder, carbon nanotubes, graphene, etc. Optionally, active material particles, for example but not limited to, activated carbon, hard carbon, soft carbon, graphite, silicon, etc., that are compatible with the aqueous solvent may be added.

The primer layer slurry may be prepared by mixing the binder, solvent, conductive material particles, and if included, the optional active material particles using a mixer, for example but not limited to, a planetary mixer, a rotary mixer, a bead mill, etc.

In accordance with various aspects of the present disclosure the primer layer slurry may alternatively include non-aqueous solvents, for example but not limited to, alcohol, acetone, ethane, ethanol, dimethyl-formamide, etc.

In accordance with various aspects of the present disclosure, a first example of a primer layer slurry including active materials (i.e., graphite) having a high proportion of binder used to form the primer layer 220 may include 15% graphite, 5% conductive carbon black, 7% binder, and 73% water.

In accordance with various aspects of the present disclosure, a second example of a primer layer slurry including active materials (i.e., graphite) having a low proportion of binder used to form the primer layer 220 may include 20% graphite, 2% conductive carbon black, 2% binder, and 76% water.

The first example of the primer layer slurry having a high proportion of binder and the second example of the primer layer slurry having a low proportion of binder may not include optimized percentages of the components of the primer layer slurry depending upon electrode requirements. One of ordinary skill in the art will appreciate that optimized percentages for the components of the primer layer slurry may fall in a range between the two examples depending upon electrode requirements.

In accordance with various aspects of the present disclosure, a third example of a primer layer slurry without active materials may include 1.5% conductive carbon black, 1.5% binder, and 97% water. One of ordinary skill in the art will appreciate that percentages for the components of the primer layer slurry may not be optimized and that other percentages for the components of the primer layer slurry may be used.

The primer layer slurry may be applied to the current collector 210 by coating or spraying the primer layer slurry into the current collector 210 using, for example but not limited to, rollers or spray methods, for example, high pressure gas or ultrasonic spray methods, thereby forming the primer layer 220. One of ordinary skill in the art will appreciate that any methods known in the art to coat or spray the primer layer slurry onto the metal current collector may be used without departing from the scope of the present disclosure. The primer layer 220 may have a thickness t2 of about 2-50 μm.

Figure 3:
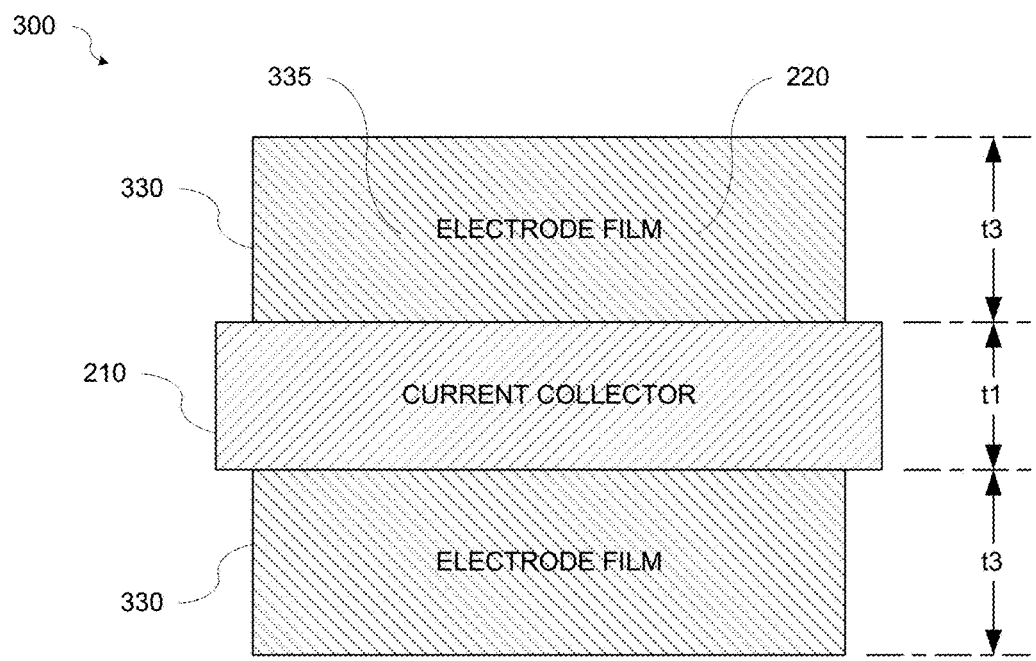
FIG. 3 is a diagram illustrating an electrode having an electrode film formed on a current collector in accordance with various aspects of the present disclosure.

FIG. 3 is a diagram illustrating an electrode 300 in accordance with various aspects of the present disclosure. Referring to FIGS. 2 and 3, an electrode film 330 may be formed by injecting dry powder electrode materials 335 into the primer layer 220 to embed the dry powder electrode materials 335 into the primer layer 220. The dry powder electrode materials 335 may be injected into the primer layer 220 as soon as possible after the primer layer slurry is applied to the current collector 210 to form the primer layer 220 while the primer layer 220 is still in a low viscosity, for example, lower than 100,000 centiPoise (cP) (i.e., liquid) state where the particles and solvent in the primer layer 220 are able to easily move around. For example, the primer layer 220 may have a viscosity high enough (for example, higher than 200 cP) to form a coherent layer on the current collector 210 but low enough (for example, lower than 100,000 cP) to permit injected dry powder electrode materials 335 to be embedded in the primer layer 220 deep enough to make electrical contact with the current collector 210. The electrode film 330 formed by the primer layer 220 and the embedded dry powder electrode materials 335 may have a thickness t3 of about 50-300 μm.

The dry powder electrode materials 335 may include dry powder active material particles, for example but not limited to activated carbon for ultracapacitors, graphite for Li-ion capacitor or battery negative electrodes, or any other powder format battery materials, for example but not limited to, LiCoO2, LiFePO4, LiMn2P4, etc., or combinations thereof. Optionally, one or more dry powder binders designed for particle-to-particle bonding (referred to herein as "PP binder") may be added. The one or more PP binders may be, for example but not limited to, PVDF, PTFE, SBR, cellulous, thermal set polyacrylonitrile, etc., or combinations thereof. Optionally, a dry powder conductive carbon material, for example but not limited to conductive carbon particles, for example but not limited to, conductive carbon black particles, conductive carbon fibers, graphite powder, carbon nanotubes, graphene, etc., may be added.

In accordance with various aspects of the present disclosure, more than one PP binder may be used in the electrode film formulation to achieve specific requirements. For example, SBR provides strong bonding between the active material particles without providing the electrode film flexibility. Adding PTFE into the electrode film formulation may improve electrode firm flexibility. One of ordinary skill in the art will appreciate that other combinations of binders may be used to achieve other electrode film requirements without departing from the scope of the present disclosure.

In accordance with various aspects of the present disclosure, when one or more dry powder binders and/or dry powder conductive carbon materials are added to the dry powder active materials a dry powder mixture may be formed by mixing the materials with a dry powder mixer or blender, for example but not limited to a rotary mixer, twin shell mixer, Warring blender, etc.

Figure 4A:
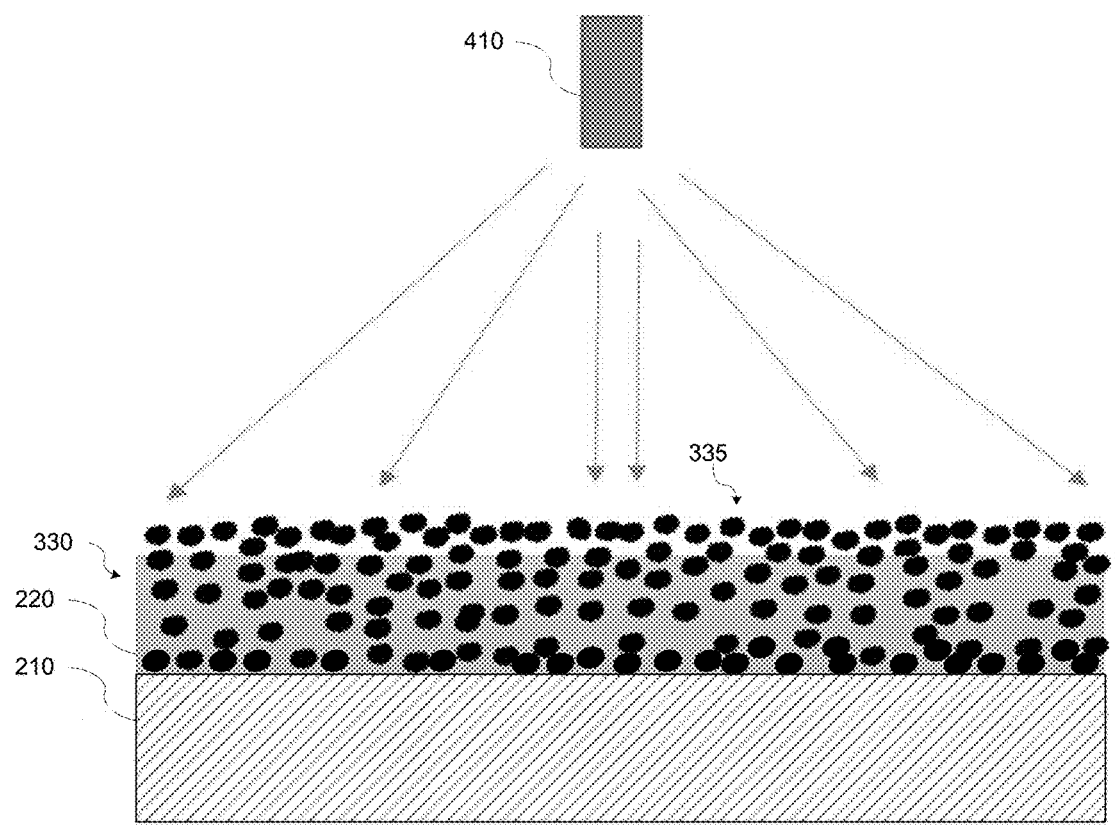
FIG. 4A is a diagram illustrating the electrode film formed with dry powder electrode materials embedded into the primer layer by spraying the dry powder electrode materials in accordance with various aspects of the present disclosure.

FIG. 4A is a diagram illustrating the electrode film 330 formed with dry powder electrode materials 335 embedded into the primer layer 220 by spraying the dry powder electrode materials 335 in accordance with various aspects of the present disclosure. Referring to FIGS. 3 and 4A, the dry powder electrode materials 335 may be embedded into the primer layer 220 by injecting the dry powder electrode materials 335 using, for example but not limited to, a high-pressure gas sprayer 410 or other injection method capable of embedding the dry powder electrode materials 335 into the primer layer 220. One of ordinary skill in the art will appreciate that any methods known in the art to inject the dry powder mixture onto the primer layer may be used without departing from the scope of the present disclosure.

The dry powder electrode materials 335 may be embedded into the primer layer 220 forming an electrode film 330 in physical and electrical contact with the current collector 210. Forming the electrode film 330 by injecting the dry powder electrode materials 335 into the primer layer 220 enables electrodes for energy storage devices to be made without using NMP such that there is no need for a solvent recovery system and no need for a long drying process, thus producing an electrode with a much lower cost.

Further, since a primer layer having a higher percentage of PM binder than PP binder in the powder mixture is coated on the current collector first, a strong PM bond forms and binder dilution in the primer layer due to subsequently injecting of the dry powder electrode materials does not alter the PM bond strength. As for the PP bond, the dry powder electrode material particles take advantage of the existing binder in the primer layer. Therefore, the addition of binder to the dry powder electrode materials mixture is optional, and may be added when the PP bond is not strong enough. In such cases, a small amount of PP binder, for example 1-2%, may be added to the dry powder electrode materials mixture. Thus, the electrode created by such process contains a minimum binder amount. Electrodes having sufficient PM and PP bond strength may be made with total binder content as low as 1.5%.

Figure 4B:
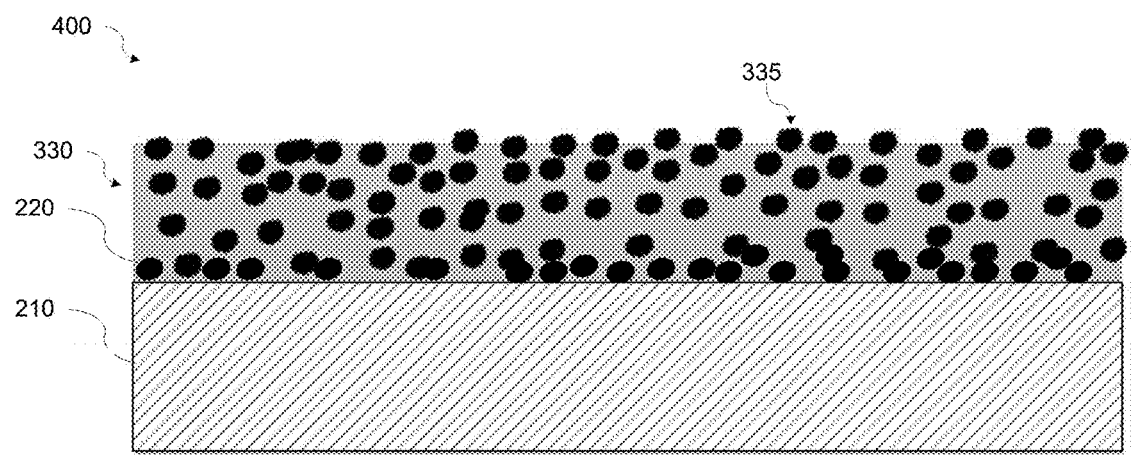
FIG. 4B is a diagram illustrating the electrode film formed with dry powder electrode materials embedded into the primer layer and excess particles of the dry powder electrode materials removed in accordance with various aspects of the present disclosure.

Unattached particles of the dry powder electrode materials 335 may remain on the surface of the electrode film 330. FIG. 4B is a diagram illustrating the electrode film 330 formed with dry powder electrode materials 335 embedded into the primer layer 220 and excess particles of the dry powder electrode materials 335 removed. Referring to FIGS. 3, 4A, and 4B, unattached particles of the dry powder electrode materials 335 may be removed from the surface of the electrode film 330 by blowing the unattached particles of the dry powder electrode materials 335 from the surface of the electrode film 330 with a pressurized gas, for example but not limited to, air or nitrogen, or by using a vacuum machine to vacuum off the unattached particles of the dry powder electrode materials 335 from the surface of the electrode film 330. In accordance with various aspects of the present disclosure, the unattached particles of the dry powder electrode materials 335 may alternatively be pressed into the electrode film 330, for example, by a roller press.

In addition to removing unattached particles of the dry powder electrode materials 335, blowing or vacuuming the unattached particles of the dry powder electrode materials 335 also dries the solvent in the primer layer 220. Accordingly, an optional short drying process, for example 1-5 minutes using a conventional hot air dryer or infrared (IR) heater operating at 100-150° C. may be used.

In accordance with various aspects of the present disclosure, the electrode 300 may be pressed to achieve specified electrode thickness and density. For example, a roller press operating at 50-200° C. may be used to press the electrode 300.

A first example of an electrode produced in accordance with various aspects of the present disclosure may include:
  A primer layer slurry formulation of 2.5% conductive carbon black, 1.5% PM binder, and 96% water; and
  A dry powder electrode materials mixture of 95% LXO, where LXO may be LiCoO2, LiFePO4, LiMn2P4, etc., or combinations thereof, and 5% conductive carbon black.

The thickness of the electrode film formed by injecting the dry powder electrode materials mixture into the primer layer may be 80 μm and the final electrode film formulation may be 90.6% LXO, 1.7% binder, and 7.6% conductive carbon black.

A second example of an electrode produced in accordance with various aspects of the present disclosure may include:
  A primer layer slurry formulation of 2.5% conductive carbon black, 1.5% PM binder, and 96% water; and A dry powder electrode materials mixture of 93% LCO, where LXO may be LiCoO2, LiFePO4, LiMn2P4, etc., or combinations thereof, 2% PP binder, and 5% conductive carbon black.

The thickness of the electrode film formed by injecting the dry powder electrode materials mixture into the primer layer may be 90 μm and the final electrode film formulation may be 92% LXO, 2.4% total binder, and 5.7% conductive carbon black.

One of ordinary skill in the art will appreciate that the above examples are illustrative and that component percentages of an electrode film produced by the disclosed methods may vary based on, for example, the amount of primer layer slurry used, the amount of dry powder electrode materials used, the amount of unattached dry powder electrode materials, etc.

Figure 5:
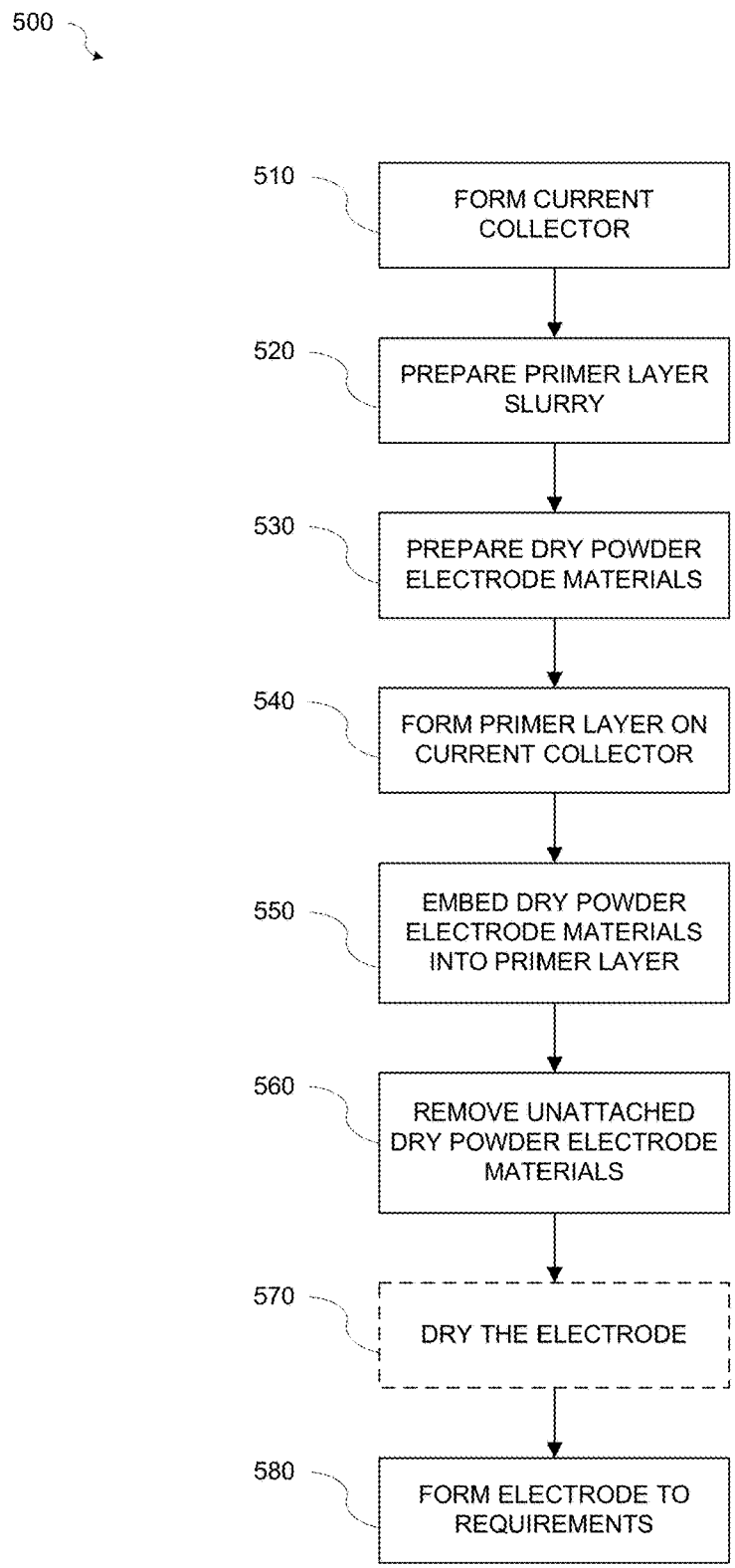
FIG. 5 is a flowchart illustrating a method for fabricating an electrode in accordance with various aspects of the present disclosure.

FIG. 5 is a flowchart illustrating a method 500 for fabricating an electrode 300 in accordance with various aspects of the present disclosure. Referring to FIGS. 2-5, at block 510 a current collector 210 may be formed. The current collector 210 may be formed from a conductive foil or mesh, for example, an aluminum (Al) foil or mesh or a copper (Cu) foil or mesh, and may have a thickness t1 of about 10-80 μm.

At block 520, a primer layer slurry may be prepared. The primer layer slurry may include a PM binder or binders to bond conductive material particles and/or active material particles to the metal current collector 210, a solvent, for example but not limited to an aqueous solvent that will dissolve the PM binder, and conductive material particles. Alternatively, the primer layer slurry may include non-aqueous solvents when Li contained active materials are used.

The primer layer slurry may be prepared by mixing the binder, solvent, conductive material particles, and if included, the optional active material particles using a mixer, for example but not limited to, a planetary mixer, a rotary mixer, a bead mill, etc.

At block 530, the dry powder electrode materials 335 may be prepared. The dry powder electrode materials 335 may include dry powder active material particles, for example but not limited to activated carbon for ultracapacitors, graphite for Li-ion capacitor or battery negative electrodes, or any other powder format battery materials. Optionally, one or more dry powder PP binders and/or dry powder conductive carbon material particles may be added. When one or more dry powder binders and/or dry powder conductive carbon materials are added to the dry powder active materials a dry powder mixture may be formed by mixing the materials with a dry powder mixer or blender, for example but not limited to a rotary mixer, twin shell mixture, wearing blender, etc.

At block 540, a primer layer 220 may be formed on the current collector 210. The primer layer slurry may be applied to the current collector 210 by coating or spraying using, for example but not limited to, rollers or spray methods, thereby forming the primer layer 220. During application, the flow rate of the of the primer layer slurry may be controlled to control the amount of primer slurry applied to the current collector 210. One of ordinary skill in the art will appreciate that other methods of controlling the amount of primer layer slurry applied to the current collector 210 may be used without departing from the scope of the disclosure.

At block 550, the dry powder electrode materials 335 may be injected into the primer layer 220. The dry powder electrode materials 335 may be injected into the primer layer 220 as soon as possible after the primer layer slurry is applied to the current collector 210 to form the primer layer 220 while the primer layer 220 is still in a low viscosity (i.e., liquid) state causing the dry powder electrode materials 335 to become embedded into the primer layer 220.

The primer layer 220 may have a viscosity high enough (for example, higher than 200 cP) to form a coherent layer on the current collector 210 but low enough (for example, lower than 100,000 cP) to permit injected dry powder electrode materials 335 to be embedded in the primer layer 220 deep enough to make electrical contact with the current collector 210. The embedded dry powder electrode materials 335 may form the electrode film 330 in physical and electrical contact with the current collector 210.

The dry powder electrode materials 335 may be injected using, for example but not limited to, a high-pressure gas sprayer 410 or other injection method capable of embedding the dry powder electrode materials 335 into the primer layer 220. During injection, the flow rate of the of the dry powder electrode materials 335 may be controlled to control the amount of dry powder electrode materials 335 injected into the primer layer 220. One of ordinary skill in the art will appreciate that other methods of controlling the amount of dry powder electrode materials 335 injected into the primer layer 220 may be used without departing from the scope of the disclosure.

At block 560, unattached dry powder electrode materials 335 may be removed from the surface of the electrode film 330. For example, the unattached dry powder electrode materials 335 may be removed by blowing the unattached particles of the dry powder electrode materials 335 from the surface of the electrode film 330 with a pressurized gas, for example but not limited to, air or nitrogen, or by vacuuming off the unattached dry powder electrode materials 335 with a vacuum machine.

At block 570, the electrode 300 may optionally undergo a drying process. In addition to removing the unattached particles, blowing or vacuuming the unattached particles also dries the solvent in the primer layer 220. Therefore, only a short drying process, for example about 1-5 minutes using a conventional hot air dryer or infrared (IR) heater operating at 100-150° C. may be used.

At block 580, the electrode 300 may be formed to specific requirements. The electrode 300 may be pressed to achieve specified electrode thickness and density. For example, a roller press operating at 50-200° C. may be used to press the electrode 300.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc., are not intended to limit the order of the operations; these words are simply used to guide the reader through the description of the methods. Further, any reference to claim elements in the singular, for example, using the articles "a," "an," or "the" is not to be construed as limiting the element to the singular.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for producing an electrode for an energy storage device, the method comprising:
   forming a current collector from a conductive material;
   forming a primer layer on the current collector;
   injecting dry powder electrode materials into the primer layer, the dry powder electrode materials comprising dry powder active material particles,
   wherein the primer layer together with the dry powder electrode materials injected into the primer layer form an electrode film in electrical contact with the current collector.

2. The method of claim 1, further comprising preparing a primer layer slurry,
   wherein the primer layer slurry comprises conductive material particles, a binder configured to bond the conductive material particles to the current collector, and a solvent configured to dissolve the binder.

3. The method of claim 2, wherein the primer layer slurry further comprises active material particles.

4. The method of claim 2, wherein the forming a primer layer on the current collector comprises applying the primer layer slurry to the current collector by one of rollers or spray methods.

5. The method of claim 1, wherein the primer layer has a viscosity high enough to form a coherent layer on the current collector but low enough to permit injected dry powder electrode materials to be embedded in the primer layer deep enough to make electrical contact with the current collector.

6. The method of claim 1, wherein the dry powder electrode materials comprise dry powder conductive carbon material particles.

7. The method of claim 1, wherein the dry powder electrode materials comprise one or more dry powder particle-to-particle binders.

8. The method of claim 1, wherein the injecting dry powder electrode materials into the primer layer comprises spraying the dry powder electrode materials into the primer layer with a high-pressure gas sprayer.

9. The method of claim 1, further comprising:
   removing unattached dry powder electrode materials from a surface of the electrode film.

10. The method of claim 9, wherein the removing comprises vacuuming the unattached dry powder electrode materials from the surface.

11. The method of claim 9, wherein the removing comprises blowing the unattached dry powder electrode materials from the surface with a pressurized gas.

12. The method of claim 1, further comprising:
    pressing unattached dry powder electrode materials disposed on a surface of the electrode film into the electrode film.

13. The method of claim 12, wherein the pressing comprises pressing the unattached dry powder electrode materials into the electrode film with a roller press.

14. The method of claim 1, further comprising:
    drying the electrode for about 1-5 minutes, the electrode including the current collector and the electrode film.

15. The method of claim 14, wherein the drying comprises drying the electrode for about 1-5 minutes with an infrared (IR) heater operating at 100-150° C., the electrode including the current collector and the electrode film.

16. The method of claim 14, wherein the drying comprises drying the electrode for about 1-5 minutes with a hot air dryer.

17. The method of claim 1, further comprising:
    pressing the electrode to a specified electrode thickness and density with a roller press, the electrode including the current collector and the electrode film.

18. The method of claim 17, wherein the pressing comprises pressing the electrode with the roller press operating at 50-200° C.

19. The method of claim 1, wherein the current collector has a thickness of about 10-80 μm.

20. The method of claim 1, wherein the primer layer has a thickness of about 2-50 μm before the dry powder electrode materials are injected.

21. The method of claim 1, wherein the electrode film has a thickness of about 50-300 μm.

22. The method of claim 21, wherein the electrode film has a thickness of about 80-90 μm.

23. The method of claim 1, further comprising:
    during the injecting, controlling the amount of the dry powder electrode materials injected into the primer layer.

24. The method of claim 23, wherein the controlling comprises controlling the flow rate of the dry powder electrode materials.

25. The method of claim 1, wherein the primer layer has a viscosity higher than 200 cP and lower than 100,000 cP.

* * * * *